March 26, 1935.  F. MADINA  1,996,048
CUTTING AND ASSEMBLING MACHINE
Filed Jan. 2, 1931  2 Sheets-Sheet 2
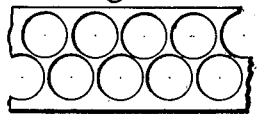
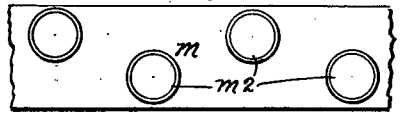
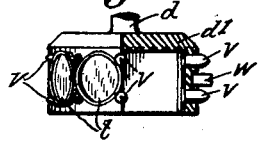
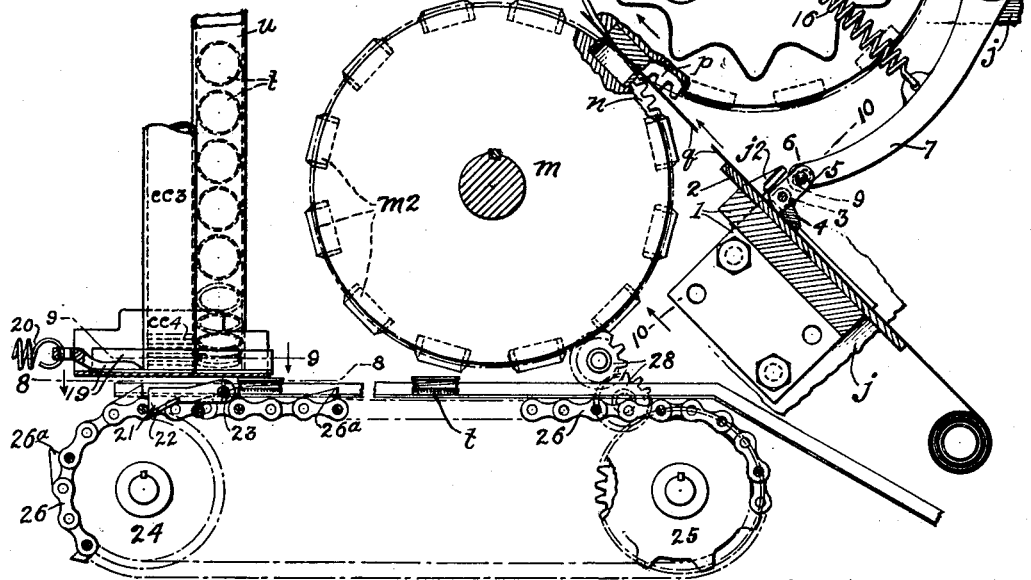
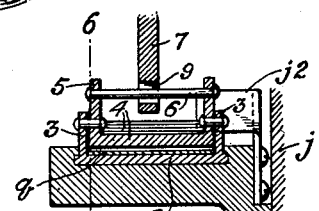
F. MADINA.
Sterling P. Buck,
Attorney.

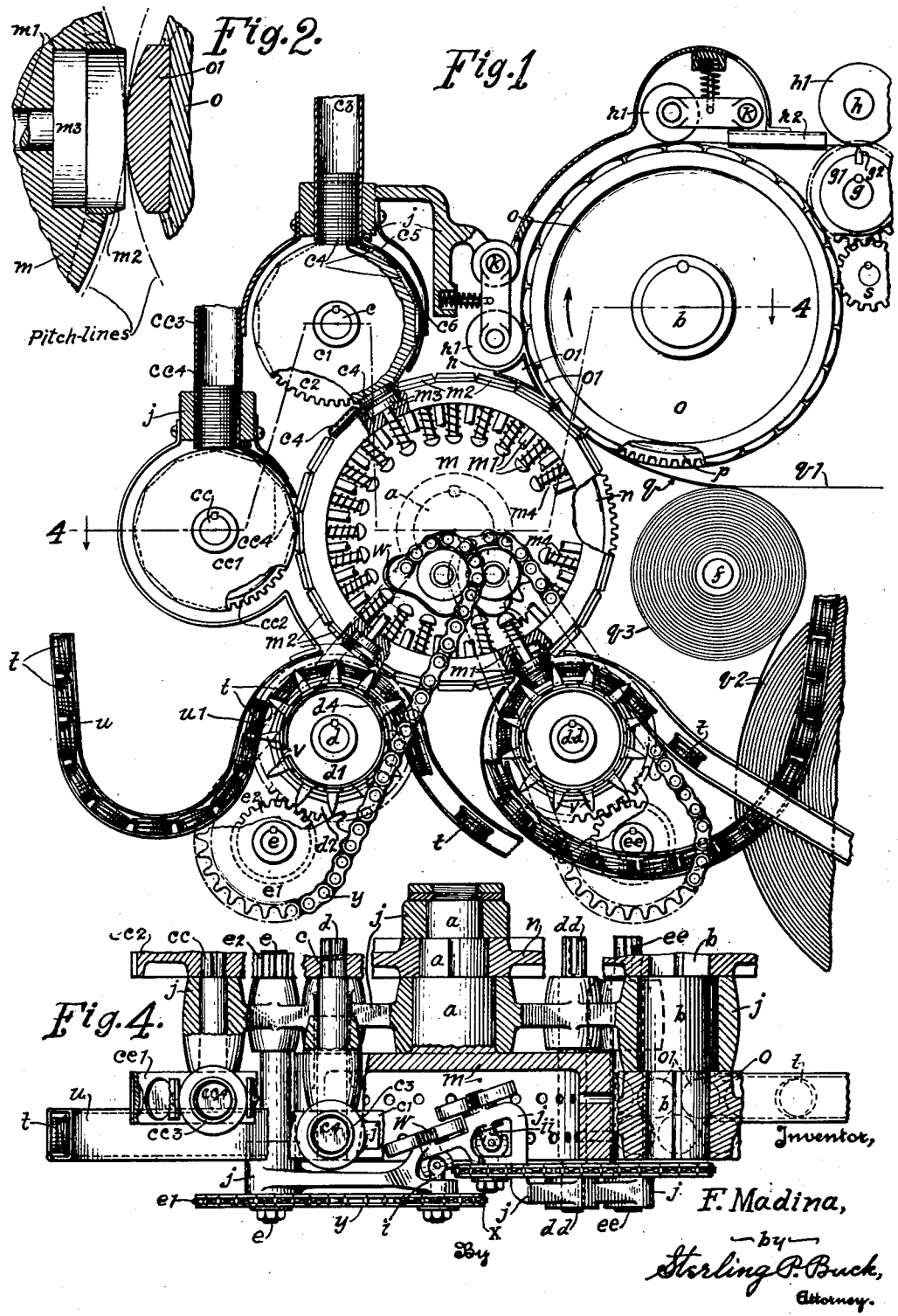

Patented Mar. 26, 1935

1,996,048

UNITED STATES PATENT OFFICE 1,996,048

CUTTING AND ASSEMBLING MACHINE

Fred Madina, Baltimore, Md.

Application January 2, 1931, Serial No. 506,406

4 Claims. (Cl. 113—80)

This invention relates to cutting and assembling machines, and especially to an improved machine for cutting and assembling discs and depositing them in the cup-like caps or crowns of bottles or jars, etc.

A very important object of this invention is to provide an improved and very effective device or mechanism that cuts or blanks the discs in precise circular shape, in contradistinction to the somewhat elliptical discs cut by previously known cutters and platens which have rolling relation to one another.

Another object is to provide improved means for feeding the caps or crowns into position for receiving the discs as they are discharged from the cutters.

Another object is to provide an improved form of rotary cutter-carrier or wheel with its two annular series of hollow cutters, the cutters of one series being in staggered relation to those of the other series for enabling them to cut the discs with the minimum of waste material and the maximum of efficiency.

Another object is to provide an improved mechanism for feeding liners or discs of cork or composition into the caps or crowns preparatory to feeding thereinto the discs cut by said cutters.

Another object is to provide a very simple and practical back-setting or back-stepping device for retracting the work-strip substantially one-half of each forward step during the cutting of a disc, so the next disc will be cut adjacent to the part from which the preceding disc is cut, thereby minimizing the waste.

Another object is to provide an improved means for ejecting the discs from the hollow cutters and pressing them into the caps or crowns.

Other objects and important features are pointed out or implied in the following details of description, in connection with the accompanying drawings in which:

Fig. 1 is a somewhat diagrammatic view partly in side elevation and partly in section, showing one form of my invention, parts of the main frame being omitted to prevent obscuring the working parts.

Fig. 2 is an enlarged sectional detail view of a fragment of the cutter-carrier, platen-carrier, a cutter and ejector united with the cutter-carrier, and a platen united with the platen-carrier.

Fig. 3 is a plan view of a fragment of a strip of sheet material from which discs were cut by this machine, showing the staggered relation, and clearly showing that there are two series of cutters and a corresponding two series of platens.

Fig. 4 is a horizontal sectional view, the section being taken in the planes of the line 4—4 of Fig. 1, parts being broken away, and other parts omitted.

Fig. 5 is a view, partly in plan and partly in section, of one of the wheels that constitute parts of the two feeding mechanisms for placing the caps or crowns in position to receive the ejected discs.

Fig. 6 is a diagrammatic view showing a modified form of the mechanism for feeding the filler-discs, and a somewhat modified form of the arrangement of the cutters and platens; also showing my back-stepping device.

Fig. 7 is a conventional plan or lay-out of a segment of the wheel or cutter-carrier shown in Fig. 6.

Fig. 8 is a plan view of the part of the feeding mechanism below the line 8—8 of Fig. 6, also showing a part of the guiding rails in cross section.

Fig. 9 is a horizontal sectional view in a plane indicated by the arrow at 9—9 of Fig. 6.

Fig. 10 is a sectional view taken along the line 10—10 of Fig. 6.

Fig. 11 is a sectional detail view showing how discs fall into the pockets of a conveying wheel such as shown in the upper-left part of Fig. 1.

Referring to these drawings in detail in which similar reference characters correspond to similar parts in the several views, the invention is described in detail as follows:

Referring first to Figs. 1 to 5 inclusive, the axles or rotary shafts $a$, $b$, $c$, $cc$, $d$, $dd$, $e$, $ee$, $f$, $g$, $h$, $i$ and $ii$ are journalled in a main frame $j$, parts of which are seen in section in Fig. 1, and which also supports the studs or stub-axles $k$. A cutter-carrier or wheel $m$ and a spur-gear-wheel $n$ are united with the shaft $a$ and are rotatable therewith. The periphery or rim of the wheel $m$ is apertured and recessed at $m1$ (Fig. 2) in two annular series, the apertures of one series being staggered with relation to those of the other series. In the apertures $m1$ are seated the cutters $m2$, also plungers or ejectors $m3$ provided with springs $m4$ (Fig. 1) to press them inward. The cutting edge of each cutter is precisely circular or annular, being in and coinciding with a plane that is tangential to the pitch-circle, that is, to a circle having a radius from the axis of the wheel $m$ to the center of the plane bounded by the cutting edge. In similar devices wherein the cutting edge coincides with the pitch-circle, the rolling of such cutting edge on a platen-supported strip produces an elliptical disc, in contradistinction to the precisely circular disc produced by my cutter and presently-described platen.

A platen-carrier or wheel $o$ and a spur-gear-wheel $p$ are united with the shaft $b$, and the wheels $n$ and $p$ mesh with one another. Platens $o1$ are united with the periphery of the wheel $o$, and these are in staggered relation corresponding to that of the cutters $m2$. The meshing of the wheels $n$ and $p$ guides each cutter to its mating platen. Because of the edge of the cutter tangentially disposed, as explained, it is necessary that the working face or cutter-meet face of each platen be not only convex, but its degree of convexity must be greater than if its radius extended from the axis of the wheel $o$. More definitely, every cutter-meeting point of said platen is equi-distant from a line parallel to the axis of the wheel $o$ and substantially halfway between said axis and cutter-meeting face. The platens are preferably of hard metal, so it is not desirable that the cutters shall come into actual contact therewith, but the word "meeting", as used herein, applies even if a space of about a thousandth of an inch exists between the cutters and their mating platens. However, it is within the scope of this invention to provide means for adjusting the platens or the cutters to reduce the meeting-space to the necessary minimum, so that the very thin uncut weakened parts of the disc-material are broken by movement of the cutters away from the platens, the discs being held in the cutters by friction of the edges of the discs.

At $q$ is shown a strip from which the discs are cut. In this illustration, the strip $q$ is a composite or laminated strip of tin-foil, indicated at $q3$; of thick paper, indicated at $q2$; and of other material, indicated at $q1$, these materials being cemented or united by any appropriate means. The strip $q$ passes between the wheels $m$ and $o$, being pulled thereby and by presser rollers presently described, and travels in the direction of the adjacent arrows, the guiding plate $r$ and spring-pressed rollers $r1$ combining with the channel $r2$ for guiding the perforated part of the strip $q$ upward and away from the machine. Clamping rollers $g1$ and $h1$, on the shafts $g$ and $h$, pull the perforated part of the strip $q$ and assist the cutters in feeding the strip, these rollers being geared with the wheel $p$ through the medium of the spur-gear-wheel $s$. A knife $g2$ is carried by the roller $g1$ to sever the waste strip.

When the discs are cut, the friction at the edges thereof hold them in the hollow cutters until the plungers $m3$ are operated to release them, and in the meantime, fillers or discs or liners of cork or composition are forced into the cutters by means of feeding wheels $c1$ and $cc1$ which are driven by spur-gear-wheels $c2$ and $cc2$ on the shafts $c$ and $cc$ and in mesh with the wheel $n$. Each of these disc-feeding devices includes a tubular shaft $c3$ and $cc3$ having therein columns of discs $c4$ and $cc4$. To elucidate, it is here explained that the parts on the shafts $c$, $d$ and $e$ cooperate with the front series of cutters $m2$ and plungers $m3$, while the parts on the shafts $cc$, $dd$ and $ee$ cooperate with the rear series of cutters $m2$ and plungers $m3$. Therefore, the operation will further be considered irrespective of the parts $cc$, $dd$ and $ee$ and their adjuncts, inasmuch as they are substantially duplicates of the adjuncts of parts $c$, $d$ and $e$.

Pockets $c7$ (Fig. 11) are provided in the periphery of the wheel $c1$, and the discs $c4$ gravitate into these pockets, one at a time, and are carried down while guided by a strip $c5$ and an adjustable tensioning spring $c6$. The gear-wheel $c2$ is in mesh with the wheel $n$ in proper relation for guiding and pressing the discs $c4$ into the annular cutters $m2$. As the wheel $m$ continues to rotate, each cutter $m2$ carries its content of discs down to be deposited in a cap or crown $t$, and the feeding mechanism of the caps or crowns is described as follows:

A preferably U-shaped tube has an outlet or opening $u1$ through which the caps or crowns $t$ gravitate onto a feeding wheel $d1$ on the shaft $d$ which also carries a spur-gear-wheel $d2$ in mesh with the wheel $n$; so the parts $d$, $d1$ and $d2$ rotate in unison. An annular series of pairs of pins $v$ are carried by the wheel $d1$ and are yieldingly held and pressed outward by an arcuate spring $d4$; each pair of pins $v$ being in the same axial plane (as indicated in Fig. 5); so, as each cap or crown $t$ falls through the opening $u1$, it is engaged by a pair of pins $v$ and carried to the proper position to receive the discs from one of the cutters, the plungers $m3$ being then operated to discharge the discs by means presently described. The weight of the column of caps or crowns in the higher part of the tube $u$ forces those in the lower part upward to the opening $u1$.

While various means may be employed for depressing the plungers $m3$, I here illustrate one means (in duplicate) comprising a triune cam $w$ for depressing three plungers $m3$ in each revolution of the cam. This cam is carried by the shaft $i$ which is jointed or includes a universal joint (seen in Fig. 4), and the shaft $i$ carries a sprocket-wheel $x$ which drives it, being itself driven by a chain $y$ and a sprocket-wheel $e1$. The wheel $e1$ and a spur-gear-wheel $e2$ are carried by the shaft $e$, and the wheel $e2$ is in mesh with the wheel $d2$.

Any appropriate means may be attached to any one of the shafts $a$, $b$, $c$, $cc$, $d$, $dd$, $e$ or $ee$, for driving the machine, inasmuch as the gear-wheels on these shafts intermesh to form a unitary gearing mechanism.

Referring now to Figs. 6 to 10 inclusive, it is noted that the cutters $m2$ and platens $o1$ are the same as those previously described, and those of the front series are staggered in relation to those of the rear series. However, there are fewer cutters in this form of the invention, for they are more widely spaced to prevent crowding, to provide more securing material between them, and to provide for back-stepping the strip so as to minimize the amount of waste of material composing the strip from which the discs or blanks are cut.

The back-stepping device comprises a guiding support $j1$ secured on the main frame $j$ and provided with a stop $j2$. A plate 2 is guided to slide in a channel of the guiding support $j1$ and forms one of the jaws that combine to clamp and release the strip $q$ which slides thereon while being fed between the cutters and platens. Standards 3 are united with the plate 2. A second plate or jaw 4 has two standards 5 that are connected by a rod 6 at their upper ends, while their intermediate parts are pivoted to the standards 3. A lever 7 is pivoted at 8 to the frame $j$ and is slotted at 9 for pin-slot connection with standards 5. An arm 10 of the lever 7 is in the path of cam elements 11 of a disc or multi-toothed cam member 12 that is adjustably secured on the wheel $o$ by bolts 13 and nuts 14 extending through slots 15 in the cam-member 12, so the latter is angularly adjustable about the axis of the shaft $b$ for properly timing the back-stepping mechanism with respect to the operation of the cutters $m2$.

At this point, it is noted that Fig. 6 shows the back-stepping device out of time, the inventor (the draftsman) having the idea of showing both cutting device and back-stepping device in their respective effective positions. However, if the cam-disc 12 were properly adjusted, the cutting device being effective as shown, the arm 7 would be swung by the spring 16, a slight distance towards the wheel $o$, so the upper part of a standard 5 would rest against the stop $j2$, so the clamping jaw 4 would be raised from the strip $q$, and so the strip could then be fed between the wheels $m$ and $o$ by their rotation. When any cutter has released the strip $q$, and before the next succeeding cutter engages with the strip, the strip is quickly retracted or back-stepped a sufficient distance to bring the part to be cut very close to the part just previously cut, thus avoiding undue waste of the strip $q$. In the operation of back-stepping the strip, one of the cam-teeth 11 depresses the arm 10 and moves the other arm of the lever 7 to the position shown where its lower side presses the strip $q$ against the plate 2, thus clamping the strip; and now, as the lever 7 continues to swing downward, it carries the parts 6, 5, 4, 3 and 2 downward, thus pulling the strip $q$ the desired distance, according to adjustment of the cam-disc 12. The cam-disc releases the arm 10 before the next succeeding cutter engages with the strip, and the spring 16 retracts the lever 7 to a position slightly beyond the position shown, that is, to the position where the upper end of one standard 5 is against the stop $j2$, and where the lower side of the plate 4 is retracted from the strip, so the strip is then free to be fed by the operation of the contiguous cutter and its mating platen.

In Fig. 6, the cutters and platens of the front series are shown in section, while those of the rear series are shown partly by dotted lines. However, they are more widely spaced from one another than those of Fig. 1, to provide more securing material between them. Because of this wider spacing, there would be a considerable waste of material in the absence of means to retract the strip $q$ after each disc is cut therefrom, and therefore, I provide the retracting or back-stepping mechanism described in the foregoing.

In the modified form of cap-feeding and disc-feeding device of Fig. 6, the feeding tubes or channels $u$ and $cc3$ are substantially the same as those in Fig. 1, but a different assembling mechanism is shown, as follows:

The feeding tube or channel $u$ has its horizontal lower end terminating in a supporting and guiding member $u2$ having an opening $u3$ through which the caps $t$ fall onto a track 17 which is formed of two angle-beams spaced from one another at 18 (Figs. 8 and 9), and a feeding carriage 19 is held against a limiting stop by means of a spring 20. This carriage has an opening $cc5$ in its bottom, and this opening is slightly larger than a disc $cc4$ so the latter can freely gravitate thereinto, one at a time. A pawl 21 is formed with a cam 22 and is pivoted at 23 to the feeding carriage, so it is operable to move the carriage against the tension of the spring 20 to a position where the opening $cc5$ registers with the opening $u3$, and by this means, the discs $cc4$ are deposited, one at a time, in the respective cups or caps that are fed onto the track 17.

Two sprocket-wheels 24 and 25 carry a chain 26 which is provided with studs or extended rivet-ends 27. The sprocket-wheel 25 is geared to the wheel $m$ by a pair of gear-wheels 28, so the chain 26 operates in unison with the wheel $m$ and travels in the direction for carrying the caps under the cutters $m2$, so the cutters (which are also carriers) discharge their respective contents into the hollow caps and onto the respective discs $cc4$ which the caps received from the carriage 19. At proper intervals on the chain 26, it is provided with lugs or pushers $26a$ which travel in the slot 18 and push the caps along the track 17. Although the motion of the chain 26 is constant, the motion of the carriage 19 is intermittent and reciprocating, and such motion is effected as follows:

A stud or abutment 29 is fixed on the frame $j$ and is in the path of the cam 22 of the pawl 21, so it raises the pawl out of engagement with the stud 27 and permits the spring 20 to return the carriage (on which the pawl is pivoted) to the position shown in Fig. 6, and there it remains until another stud 27 engages the pawl and thereby pushes the feeding carriage forward to the position where it deposits another disc $cc4$ just before another lug or pusher $26a$ advances the cap $t$ and permits another cap to fall through the opening $u3$; whereupon, the stud 29 and cam 22 again lift the pawl and permit the carriage 19 to return to its position of rest. It should be understood that the cutters $m2$ of Fig. 6 are provided with ejectors $m3$ such as shown in Figs. 1 and 2, although not shown in Fig. 6, their reshowing seeming unnecessary, and the same is true of the means for depressing the ejectors. It should also be understood that the stud to which the spring 16 is anchored is not on the cam-disc 12, but on the frame $j$.

While I have specifically described this invention as applied to the cutting and assembling of discs, it is to be understood that it is as applicable to blanks of various shapes and cut or punched from various kinds and thicknesses of sheet-material, whether in strips or other shapes. Neither is the invention limited to the exact details of construction and arrangement or combination as herein described and shown, for various changes may be made within the scope of the inventive ideas as implied and claimed.

What I claim as my invention is:

1. In a device for cutting sheet blanks and inserting them in caps, the combination of a cutter-carrier comprising a wheel mounted to rotate about its axis, a series of hollow cutters united with the periphery of said wheel, a second wheel mounted in cooperative relation to the first said wheel, a series of platens united with the periphery of said second wheel and thereby held operable to combine with said cutters in cutting said blanks, means to place a second blank in each of the hollow cutters and against each of the first said blanks so that each hollow cutter contains two blanks, means to place hollow caps in a position to receive the blanks from the hollow cutters, and means to transfer the blanks from the hollow cutters to the hollow caps.

2. In a machine for conveying hollow caps and placing blanks therein, the combination with a blank-carrier operable for releasing the blanks, of a rotary member mounted in cooperative relation to said blank-carrier and including radially disposed spaced pairs of spaced longitudinally depressible pins, means to carry the hollow caps and to guide them into a position to be engaged by said pairs of radially disposed depressible pins, and means to rotate said rotary member for causing said pins to take the control of said caps from the first said means so as to properly position the respective caps for receiving blanks released from said blank-carrier, substantially as specified.

3. In an assembling device, the combination of a rotary member having hollow carriers on its periphery, a second rotary member having peripheral means to receive articles one by one from a column and transfer them to said hollow carriers in consequence of rotation and cooperation of the said rotary members, means for placing hollow receptacles in a position to receive the articles respectively from said hollow carriers, and means operable in correlation with the receptacle-placing means for ejecting the articles from said hollow carriers into said hollow receptacles.

4. In an assembling device, the combination of a rotary member having hollow carriers on its periphery, a second rotary member geared to the first said rotary member and having pushers in spaced relation thereon, a track properly located to receive hollow receptacles immediately thereon and properly correlated with said pushers and hollow carriers so as to guide each hollow receptacle thereon into a position for receiving an article from any one of the hollow carriers and for being pushed therealong to said position by any one of said pushers, means to feed the hollow receptacles immediately onto said track, and means to place an article in the hollow receptacle preparatory to being pushed by said pusher along said track to the position for receiving the article from said hollow carrier.

FRED MADINA.